Patented Feb. 27, 1923.

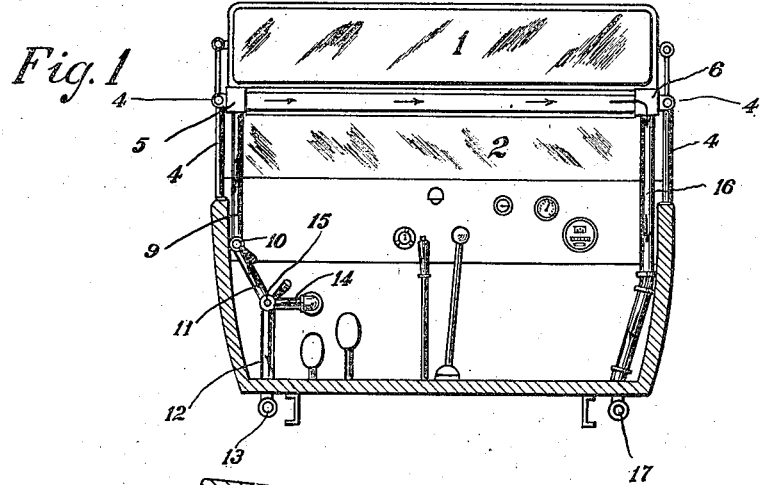
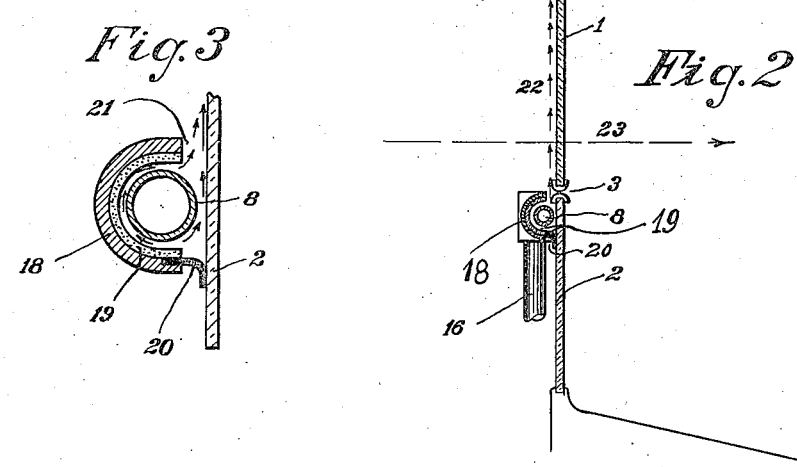
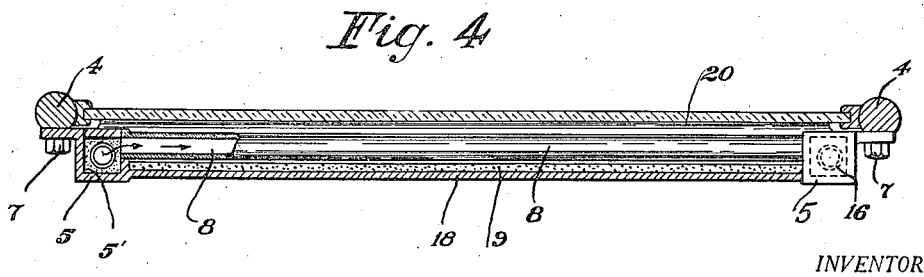

1,446,849

UNITED STATES PATENT OFFICE.

LOUIS LA PERLE, OF HOLYOKE, MASSACHUSETTS.

WINDSHIELD HEATER.

Application filed April 1, 1922. Serial No. 548,865.

*To all whom it may concern:*

Be it known that I, LOUIS LA PERLE, a citizen of the United States of America, residing at Holyoke, county of Hampden, Commonwealth of Massachusetts, have invented certain new and useful Improvements in Windshield Heaters, of which the following is a specification.

This invention relates to improvements in devices for melting snow or ice which may have collected on the outer surface of the windshield of a motor vehicle. It is designed to be located along on the inner surface of the windshield and so placed that the line of vision of the operator will not be obstructed.

An object of the invention is to provide a device that may be readily connected to and disconnected from the pipe which conveys the heated exhaust gases from an internal combustion engine, whereby these heated gases may be utilized to warm the inner surface of the windshield for melting snow and ice on the outer surface.

A further object is to provide a heating device which will prevent the heat from being driven downward and only deflected or carried upward, along the inner surface of the upward portion of the windshield.

A further object is to provide means for connecting and disconnecting the device to the source of heat.

Referring to the drawings:

Fig. 1 is a transverse sectional view of a motor vehicle showing the forward interior portion looking toward the forward end of the car and showing the attachment of the heating device and the connections for diverting the heated gases through the same.

Fig. 2 is a vertical sectional view substantially on the line 2—2 of Fig. 1 showing the arrows indicating the passage of the heat upward and along on the inner surface of the windshield.

Fig. 3 is an enlarged transverse sectional view of the heater pipe showing the asbestos lining for the enclosing shield, the rubber packing between the windshield and the shield or casing, and Fig. 4 is a sectional plan view on the line 4—4 of Fig. 1 showing the manner of attaching the heater pipe to the upright posts of the windshield.

Referring to the drawings in detail:

1 and 2 designate the upper and lower sections respectively of the windshield which have their edges adjacent each other in the usual way, as indicated at 3. 4 designates the usual upright rods or posts that are located at the opposite sides of the body of the vehicle. Attached to these posts are boxes 5 and 6 by any suitable means as the bolts indicated at 7. Connecting these posts is a pipe 8 which is designed to carry some of the heated products of the combustion engine. Connected to the left hand end of the pipe 8 is a pipe 9; in this pipe is a shut-off valve 10. 11 indicates a length of the pipe which is connected to the pipe 9 and which is also connected to the pipe 12 which extends downward through the bottom of the car where it is connected to the exhaust pipe 13. 14 is the exhaust pipe which carries the heated gases from the engine and in this pipe is a valve 15. By turning the valve 15 into a suitable position the heated gases may be deflected upward through the pipes 9 and 11, as indicated by the arrows. The heated gases will pass through the pipe 8 and downward through the exhaust and discharge pipe 16 where they escape through the pipe 17 into the atmosphere. In order to prevent the pipe 8 from being exposed or so that an occupant of the car would not be accidently burned, it is encased within a metal shield 18 which is lined with asbestos indicated at 19. This shield is spaced from the windshield 1 and is closed at its edge by means of the strip of rubber 20 for preventing the heated air about the pipe 8 from being drawn downward into the car. The upper edge of the shield is spaced from the windshield 1 as indicated at 21 permitting the heated air to pass upward and along the inner surface of the windshield 1 as indicated by the arrows 22. This will serve to melt the ice and snow on the outer surface of the windshield. In order not to obstruct the line of vision of the operator which line is indicated by the arrow 23, the pipe 8 is located below this arrow.

Opening the valves 15 and 10 the heated gases may be driven through the pipe 8 and by closing the valve 10 they may be completely shut-off from flowing through the pipe 8. This device may be readily connected and disconnected when not in use and may be fitted to cars of different sizes.

It is of course, obvious that I do not limit myself to any particular arrangement of the connecting pipes which conduct the heated gases to and from the pipe 8, as those shown are merely illustrative. I may if desired, use a flexible hose for connecting pipe.

The pipe attaching boxes 5 are lined with some non-conductor of heat as sheet asbestos which is indicated at 5'.

When the vehicle is in motion the draft of air would force or deflect the heated air around the pipe 8 downward. In order to prevent this the strip of rubber 20 is provided so that all of the heated air may flow upward as indicated by the arrows at 22. It is also obvious that the pipe 8 may be removed when the device is not in use during the summer months.

What I claim is:

1. In a device for the purpose described, the combination with the windshield of a motor vehicle, provided with an internal combustion engine, of a pipe extending across the inner surface of the same, means for supporting the pipe in spaced relation from the windshield, a shield for the pipe, and pipe connections connected to the opposite ends of said pipe for conducting and transmitting the heated gases from the exhaust pipe of the internal combustion engine to and from said pipe.

2. A device for melting ice and snow from the windshield of a motor vehicle provided with an internal combustion engine, comprising a pipe attached below the line of vision to the uprights or posts which support the windshield, means for insulating the heat of the pipe from the supporting posts, means for conducting the heated gases of the engine to and from the pipe, valves in the conducting means for controlling the flow of heated gases through the pipe.

3. In a device for heating the inner surface of the windshield of a motor vehicle provided with an internal combustion engine, a pipe extending across this surface and below the line of vision, said pipe being connected to the exhaust pipe of the internal combustion engine, means for controlling the flow of the hot exhaust gases through said pipe, a shield for the outer surface of the pipe and spaced away from the windshield, and means for connecting the same to the supporting device of the windshield.

4. A windshield heating device for motor vehicles provided with an internal combustion engine, comprising a pipe extending along the inner surface of the shield for conveying the exhaust gases from the engine, means for protecting that part of the pipe which is towards the operator and comprising a shield partially encircling the pipe, said protecting shield having a lining which is a non-conductor of heat, and pipe connections for admitting and discharging the hot gases to and from said pipe.

5. A windshield heating device for motor vehicles provided with an internal combustion engine, comprising a pipe extending along the inner surface of the shield for conveying the exhaust gases from the engine, means for protecting the part of the pipe which is towards the operator and comprising a shield partially encircling the pipe, said protecting shield having a lining which is a non-conductor of heat, and pipe connections for admitting and discharging the hot gases to and from said pipe, and an insert piece between the lower edge of the protecting shield and the windshield for preventing the heat from the pipe from being deflected or blown downward when the vehicle is in motion.

LOUIS LA PERLE.